United States Patent
Park et al.

(10) Patent No.: US 10,171,136 B2
(45) Date of Patent: Jan. 1, 2019

(54) REDUCING INTERNAL SIGNALING BURDEN IN THE DISTRIBUTED ANTENNA SYSTEM

(71) Applicant: LG ELECTRONICS INC., Seoul (KR)

(72) Inventors: Kyungmin Park, Seoul (KR); Jiwon Kang, Seoul (KR); Kitae Kim, Seoul (KR); Kilbom Lee, Seoul (KR); Heejin Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/154,582

(22) Filed: May 13, 2016

(65) Prior Publication Data
US 2016/0337010 A1 Nov. 17, 2016

Related U.S. Application Data (60) Provisional application No. 62/161,276, filed on May 14, 2015.

(51) Int. Cl.
| | |
|---|---|
| H04W 88/00 | (2009.01) |
| H04B 7/0404 | (2017.01) |
| H04L 5/00 | (2006.01) |
| H04W 88/02 | (2009.01) |
| H01Q 1/32 | (2006.01) |
| H01Q 21/28 | (2006.01) |

(52) U.S. Cl.
CPC ......... *H04B 7/0404* (2013.01); *H01Q 1/3275* (2013.01); *H01Q 21/28* (2013.01); *H04L 5/0055* (2013.01); *H04W 88/02* (2013.01)

(58) Field of Classification Search
USPC ... 455/19, 127.1, 562.1, 272, 7, 63.4, 82, 83
See application file for complete search history.

(56) References Cited

U.S. PATENT DOCUMENTS

| | | | |
|---|---|---|---|
| 8,345,693 B1* | 1/2013 | Kim | H04B 7/026 370/400 |
| 2007/0136633 A1* | 6/2007 | Lee | H04L 1/0057 714/748 |
| 2008/0227434 A1* | 9/2008 | Nitta | H04B 7/18506 455/414.1 |
| 2010/0152947 A1* | 6/2010 | Denholm | G07C 5/0808 701/29.6 |
| 2011/0110449 A1* | 5/2011 | Ramprashad | H04L 1/0003 375/261 |
| 2011/0300849 A1* | 12/2011 | Chan | H04L 1/1867 455/422.1 |

(Continued)

*Primary Examiner* — Ganiyu A Hanidu
(74) *Attorney, Agent, or Firm* — Birch, Stewart, Kolasch & Birch, LLP (57) ABSTRACT

The present document is for a wireless communication with reduced internal signaling burden in the distributed antenna system (DAS). In the proposed method, a user equipment (UE) receives a first information unit from the network by a first distributed unit (DU) among multiple DUs distributed within the UE. The first DU reports reception information of the first information unit to a central unit (CU) of the UE, wherein the CU controls the multiple DUs. The first DU receives, from the CU, a direction regarding a transfer of the first information unit to the CU, and transfers the first information unit to the CU when the direction indicates a specific value.

14 Claims, 10 Drawing Sheets

(56) References Cited

U.S. PATENT DOCUMENTS

| | | | | |
|---|---|---|---|---|
| 2013/0194961 A1* | 8/2013 | Kang | ............... | H04B 7/0473 |
| | | | | 370/252 |
| 2014/0003327 A1* | 1/2014 | Seo | ............... | H04W 36/08 |
| | | | | 370/315 |
| 2014/0086353 A1* | 3/2014 | Ni | ............... | H04B 7/0482 |
| | | | | 375/267 |
| 2015/0057873 A1* | 2/2015 | Lammers | ............... | B60C 23/0461 |
| | | | | 701/29.7 |
| 2015/0319634 A1* | 11/2015 | Zwirn | ............... | G01S 11/02 |
| | | | | 370/252 |

* cited by examiner

REDUCING INTERNAL SIGNALING BURDEN IN THE DISTRIBUTED ANTENNA SYSTEM

CROSS REFERENCE

This application claims the benefit of the U.S. Provisional Patent Application No. 62/161,276, filed on May 14, 2015, which is hereby incorporated by reference as if fully set forth herein.

BACKGROUND OF THE INVENTION

Technical Field

The present document is for a wireless communication system. More particularly, the present document is for a wireless communication with reduced internal signaling burden in the distributed antenna system (DAS).

While the present document mainly discuss this with the example of implementing in-vehicle DAS system, it is only exemplary, and the proposed scheme/structure can be used for simple configuration of MIMO system with DAS configuration.

Discussion of the Related Art

In the conventional mobile communication system for mainly serving personal mobile communication devices, there is an inverse proportional relationship between the speed of the UE and required data rate/QoS. So, the conventional communication system is configured to provide high data rate/QoS for low speed UE, and to provide reliable service without radio link failure for the high speed UE even the data rate/QoS is somewhat low.

In the next generation communication system, there is a need for high data rate/QoS for the high speed UE, since the scope of the required service increase. For example, the users in the vehicle or public transportation would like to enjoy multi-media service during the drive through highway. Also, users want to enjoy multi-media service more while the speed of the vehicle is high.

In order to fulfil these needs, there can be two approaches. One is improving the network infra itself for high quality service to high speed users, and the other is a new system/scheme for this without affecting the network infra.

As one of the solution for the second approach, a vehicular MIMO system is considered. In conventional vehicular MIMO system, large size antenna arrays are implemented to the vehicle for this end. However, implementing the large size antenna array in the outside of vehicle has drawback for vehicle design and for aerodynamics. So, the vehicle vendors are reluctant to implement this kind of large antenna array. Presently, vendors prefer to use shark antenna system in their vehicle.

Figure 1:
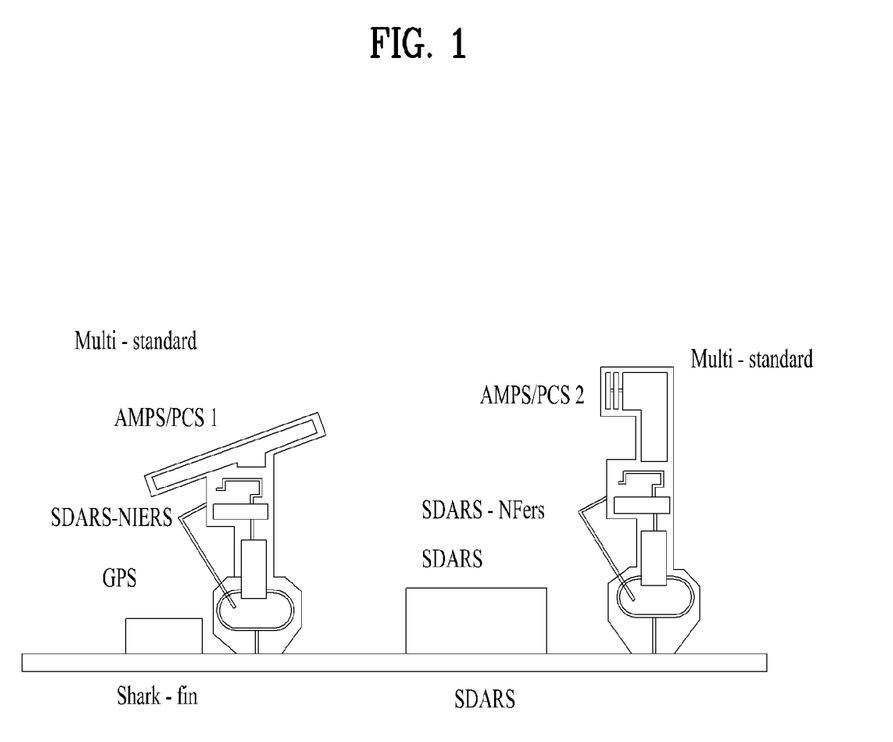
FIG. 1 shows a structure of conventional shark antenna system for vehicular communication.

FIG. 1 shows a structure of conventional shark antenna system for vehicular communication.

The conventional shark antenna system is a combinational antenna system. As shown in FIG. 1, the shark antenna system implemented various antennas within one physical structure. In FIG. 1, the shark antenna includes combined structure for 4 or more different band/services in one antenna. So, it has limit for providing high quality mobile communication service.

However, the reason why the vendors prefer this instead of large antenna system is to reduce the space for the antennas. Large sized antennas would not good for car design and reduce the original driving performance of the vehicle.

SUMMARY OF THE INVENTION

Technical Problem

In order to solve this problem, the inventors of the present invention proposed to use the in-vehicular distributed antenna system (hereinafter, in-vehicle DAS system).

Figure 2:
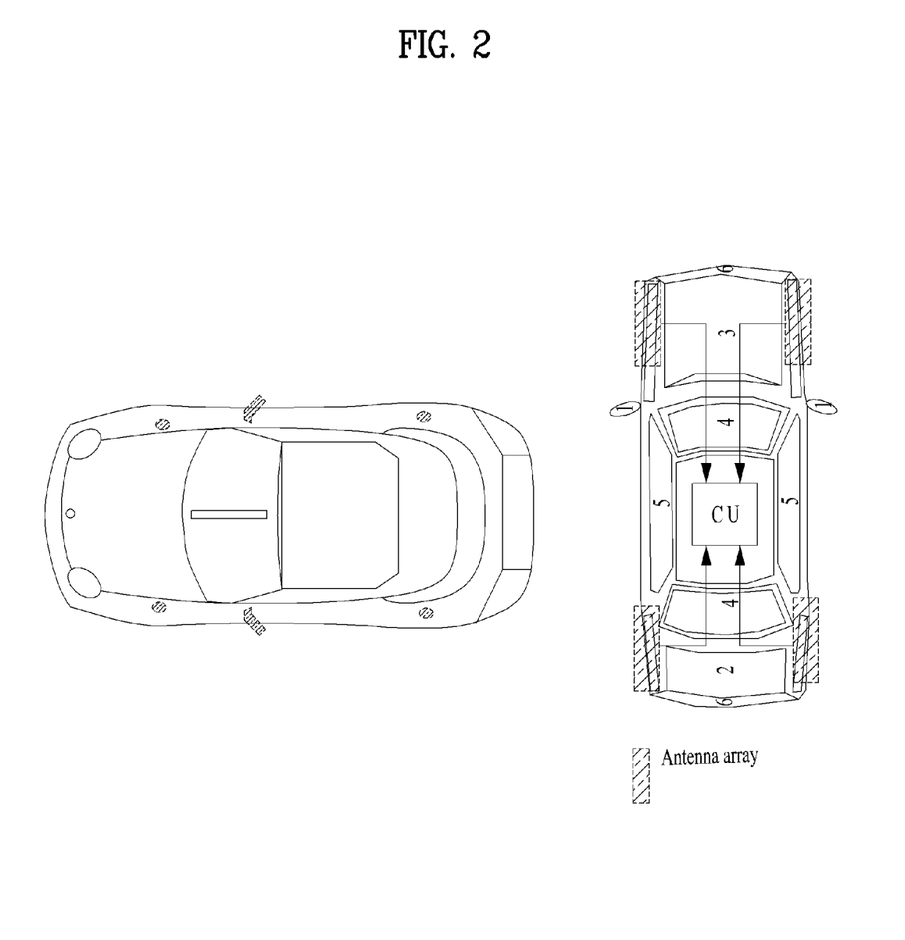
FIG. 2 shows a concept of in-vehicle DAS system implemented into a car.

FIG. 2 shows a concept of in-vehicle DAS system implemented into a car.

As shown in FIG. 2, in-vehicle DAS system uses relatively small multiple antenna units distributed within the vehicle. Multiple antenna units may be hidden at each corner of the car as shown in FIG. 2, for example. These multiple antenna units can be referred to as 'DUs (Distributed Units)'. A CU (central unit) of in-vehicle DAS system can control each of DUs of the vehicle.

Since DUs are separated within the vehicle, the physical channel characteristics would be different and independent. This can provide diversity gain, but it can increase signaling overhead in order to consider each of the physical channel characteristics.

Also, in order to implement in-vehicle DAS system, additional consideration is required comparing to the conventional MIMO system.

Figure 3:
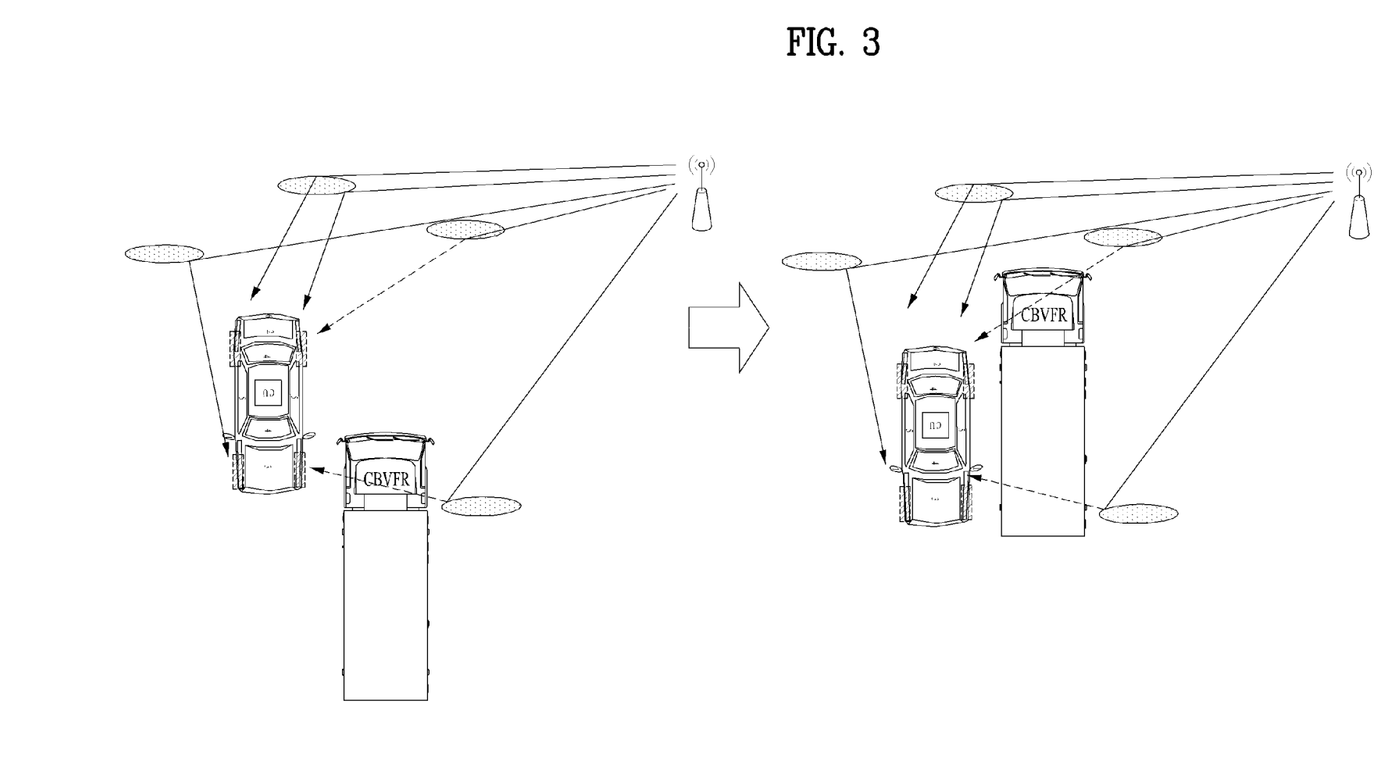
FIGS. 3 and 4 show an example of required additional consideration for cell selection when in-vehicle DAS system is implemented.
Figure 4:
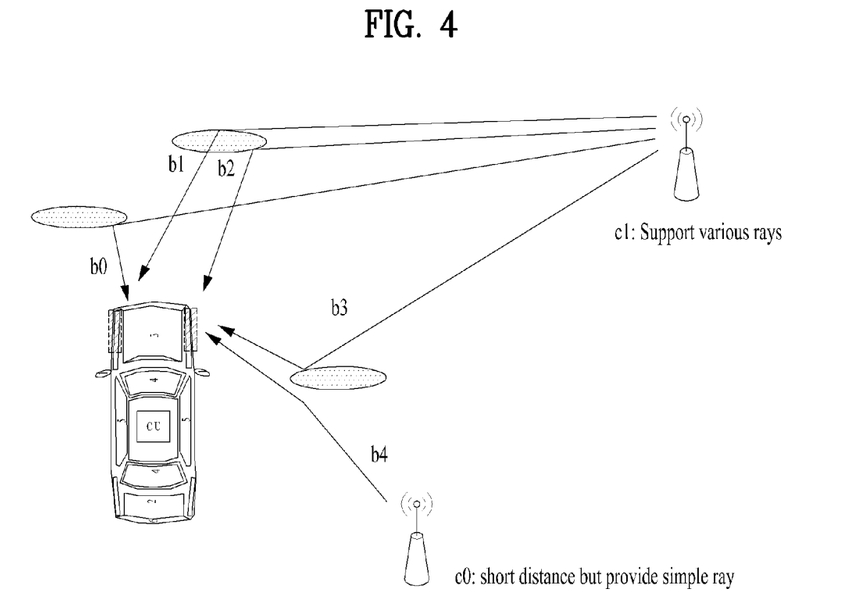

FIGS. 3 and 4 show an example of required additional consideration for cell selection when in-vehicle DAS system is implemented.

In the conventional mobile communication system, the cell selection is performed when the signal strength of the received signal decreases and there is another cell with higher signal strength. That is, the cell selection is performed only based on the signal strength of each cell. But, when in-vehicle DAS system is implemented, it would be better to consider also the diversity of the ray for each DU.

In FIG. 3, a big truck is moving along with the vehicle in communication. If the speed of two cars is similar, the rays from a network in certain direction might be blocked for significant amount of time. It might degrade the quality of service for users in the vehicle. So, it would be better to consider also the diversity of rays when performing cell selection.

As shown in FIG. 4, the first cell (c0) is the closest cell providing the strongest signal, but it provides only one directional ray. But, the second cell (c1) provides various rays even its signal strength is somewhat lower than the first cell (c0). In this case, the second cell (c1) can be a better choice since the diversity in ray distribution provides more stable service as explained with FIG. 3.

So, in-vehicle DAS system may require additional consideration and the complexity increases.

Figure 5:
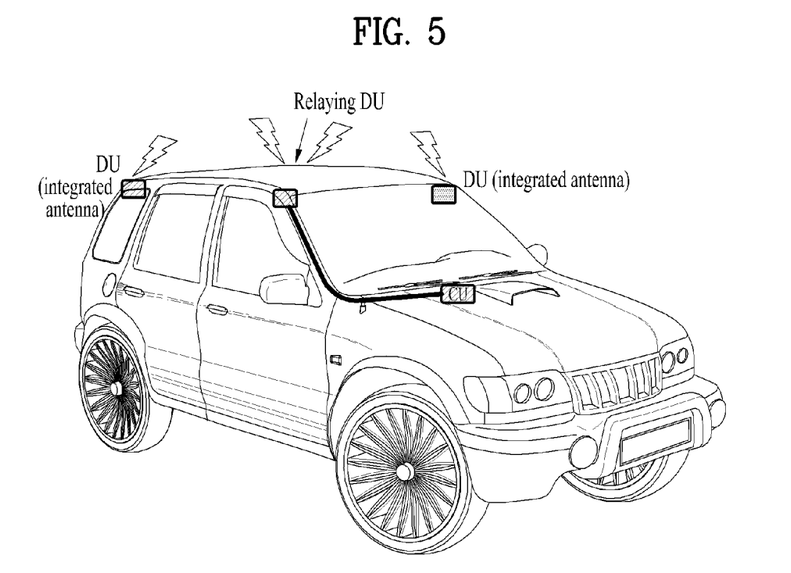
FIG. 5 shows an exemplary structure of in-vehicle DAS system.

FIG. 5 shows an exemplary structure of in-vehicle DAS system.

As shown in FIG. 5, multiple DUs can be implemented at each corner of car as with integrated antenna in it. CU may be located at the center of the car and control the multiple DUs. In order to do it, there need connections between CU and multiple DUs, and it would be preferable to establish it as lossless cable or by using lossless wireless communication units. This internal communication units can be referred to as 'relaying DU' as shown in FIG. 5.

If each DU just forwards the received RF signals to CU with relaying DU, the cable (for example) has significant burden to convey the RF signals lossless. It would cost high to meet this requirement. Also, when the car has accident and the cable is broken, the cost of repair would be significant.

Technical Solution

To achieve these and other advantages, a method for a user equipment (UE) to receive signals from a network, the method comprising: receiving a first information unit from the network by a first distributed unit (DU) among multiple DUs distributed within the UE; reporting, by the first DU, reception information of the first information unit to a central unit (CU) of the UE, wherein the CU controls the multiple DUs; receiving, at the first DU from the CU, a direction regarding a transfer of the first information unit to the CU; and transferring the first information unit to the CU when the direction indicates a specific value, is proposed.

Here, the first information unit can be a unit for which determination of decoding failure or success can be made. For example, the first information unit can be a unit of 'codeword' as in LTE/LTE-A system, but various information unit/format can correspond to this concept.

The method may further comprise: decoding the first information unit at the first DU, wherein the reception information may include whether the first information unit is successfully decoded.

The CU may send the direction to transfer the first information unit, only when the first information unit is successfully decoded by the first DU.

The CU may send the direction to transfer the first information unit, when the first information unit is not successfully decoded by the first DU but the first information unit can be successfully decoded by the CU if the first information unit received by the first DU is combined with a second information unit received by a second DU among the multiple DUs, where the first and the second information unit represent the same information.

The CU may send a negative acknowledgement (NACK) for the first information unit to the network, when the CU fails to acquire successfully decoded first information unit.

The method may further comprise: decoding the first information unit at the first DU, wherein the direction further indicates whether to decode the first information unit, and wherein the decoding the first information unit is performed when the direction indicates to decode the first information unit.

The direction may indicate one of:

transferring the first information unit to the CU without decoding the first information unit, transferring the first information unit to the CU only when decoding of the first information unit is successful, decoding the first information unit and reporting the decoding result to the CU, or not sharing the first information unit with the CU or another DU.

The reception information may include an index of the first information unit and an index of the first DU.

The CU can identify whether the first information unit received by the first DU represents the same information or independent information from a second information unit received by a second DU based on the index of the first information unit.

The UE may be implemented on a motor vehicle, and wherein the multiple DUs are distributed within the motor vehicle.

To achieve the object of the invention, another aspect of the present invention proposes a user equipment (UE) comprising: multiple distributed units (DUs), each of which includes antenna component to receive information unit from the network; and a central unit (CU) controlling the multiple DUs, wherein each of the multiple DUs further includes: a processor configured to report reception information of the information unit received at each of the multiple DUs to the CU, and an internal communication unit configured to transfer the received information unit in response to a reception of a direction from the CU indicating a specific value.

The CU may include: an internal communication unit configured to receive the reception information from each of the multiple DUs and to send the direction based on the reception information; a processor processing the reception information and generating the direction; and a wireless transmitter for transmitting a negative acknowledgement (NACK) to the network, when the CU fails to acquire successfully decoded information unit.

The UE may be implemented on a motor vehicle, and wherein the multiple DUs are distributed within the motor vehicle.

Advantageous Effects

By using the above scheme, the signaling overhead between CU and DU can be significantly reduced. So, it would make the cost of implementation lower than before. Also, it can make it possible to develop the standardization for high rank communication and simultaneous multiple codewords transmission, since it can reduce the burden in the DAS system.

Effects obtainable from the present invention may be non-limited by the above mentioned effect. And, other unmentioned effects can be clearly derived and understood from the following description by those having ordinary skill in the technical field to which the present invention pertains. Moreover, the present invention may have an unexpected advantage while those skilled in the art implement the present invention based on the following description.

BRIEF DESCRIPTION OF THE DRAWINGS

The accompanying drawings, which are included to provide a further understanding of the invention, provide embodiments of the present invention together with detailed explanation. A technical characteristic of the present invention may be non-limited by a specific drawing. A new embodiment can be configured by combining characteristics disclosed in each drawing with each other. Reference numerals in each drawing mean structural elements.

DETAILED DESCRIPTION OF THE INVENTION

Although terminologies used in the present specification are selected from general terminologies used currently and widely in consideration of functions, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the specification. Therefore, terminologies used in the present specification need to be construed based on the substantial meanings of the corresponding terminologies and the overall matters disclosed in the present specification rather than construed as simple names of the terminologies.

The following embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment.

Procedures or steps probably making the point of the present invention unclear are skipped and procedures or steps understandable by those skilled in the art are also skipped as well.

In the present application, such a terminology as 'comprise', 'include' or the like should be construed not as excluding a different component but as further including the different component unless there is a special citation. And, in the present specification, such a terminology as '... unit', '... device', 'module' or the like means a unit for processing at least one function or an operation and can be implemented by a hardware, a software, or a combination thereof. Moreover, "a or an", "one", "the" or a similar related word can be used as a meaning including both a singular number and a plural number in the following contexts (in particular, in the following contexts of the claims) unless it is clearly contradicted to a context of the present invention.

In the present specification, the embodiments of the present invention are explained in a manner of mainly concerning data transmission and reception between a base station and a mobile station. In this case, the base station has a meaning of a terminal node of a network performing a direct communication with the mobile station. In the present disclosure, a specific operation, which is explained as performed by the base station, may be performed by an upper node of the base station in some cases.

In particular, in a network constructed with a plurality of network nodes including a base station, it is apparent that various operations performed for communication with a mobile station can be performed by the base station or other networks except the base station. 'Base station (BS)' may be substituted with such a terminology as a fixed station, a Node B, an eNode B (eNB), an advanced base station (ABS), an access point (AP) and the like.

And, a mobile station (MS) may be substituted with such a terminology as a user equipment (UE), a subscriber station (SS), a mobile station subscriber station (MSS), a mobile terminal (MT), an advanced mobile station (AMS), a terminal, and the like.

And, a transmitting end corresponds to a fixed and/or mobile node providing a data service or an audio service and a receiving end corresponds to a fixed and/or mobile node receiving the data service or the audio service. Hence, a mobile station becomes the transmitting end and a base station may become the receiving end in uplink. In the same manner, the mobile station becomes the receiving end and the base station may become the transmitting end in downlink.

And, when a device performs communication with a 'cell', it may indicate that the device transceives a signal with a base station of the cell. In particular, although the device actually transmits and receives a signal with a specific base station, for clarity, it may be represented as the device transmits and receives a signal with a cell formed by the specific base station. Similarly, a 'macro cell' and/or 'small cell' may indicate a specific coverage, respectively. Moreover, the 'macro cell' and/or the 'small cell' may indicate a 'macro base station supporting the macro cell' and a 'small cell base station supporting the small cell', respectively.

The embodiments of the present invention can be supported by standard documents disclosed in at least one of IEEE 802.xx system, 3GPP system, 3GPP LTE system and 3GPP2 system. In particular, unmentioned clear steps or parts of the embodiments of the present invention can be explained with reference to the aforementioned standard documents And, all terminologies disclosed in the present specification can be explained by the aforementioned standard document. In particular, embodiments of the present invention can be supported by at least one of a standard document of IEEE 802.16 including P802.16e-2004, P802.16e-2005, P802.16.1, P802.16p, and P802.16.1b.

In the following, preferred embodiment according to the present invention is explained in detail with reference to attached drawings. Detailed description disclosed together with the accompanying drawings is intended to explain not a unique embodiment of the present invention but an exemplary embodiment of the present invention.

Moreover, specific terminologies used in the embodiments of the present invention are provided to help understanding of the present invention and the use of the specific terminologies can be modified in a different form in a scope without departing from the technical idea of the present invention.

In one aspect of the present invention, a method is provided to keep the benefit of Rx diversity of using multiple DUs and reducing the signaling burden on the internal communication between DUs and CU, thereby enhancing the performance of vehicular MIMO. To this end, the flow of control information for correctly determining the reception reliability at each DU is designed. Also, the determining criteria for determining whether or not the received information unit is to be transferred to the CU are proposed.

As shown in FIG. 5, it would be efficient to use one large capacity cable between one specific DU and to use low capacity cable or wireless connection between the other DUs and between each DU and the CU. This structure can save the cost of implementing this in-vehicle DAS system.

With this structure, it is not the amount of information conveyed from each DU to CU, but the total amount of information conveyed from all the DUs to CU, that determines the performance of this system. So, the following explanation is for controlling the total amount of information conveyed by all the DUs to CU.

Figure 6:
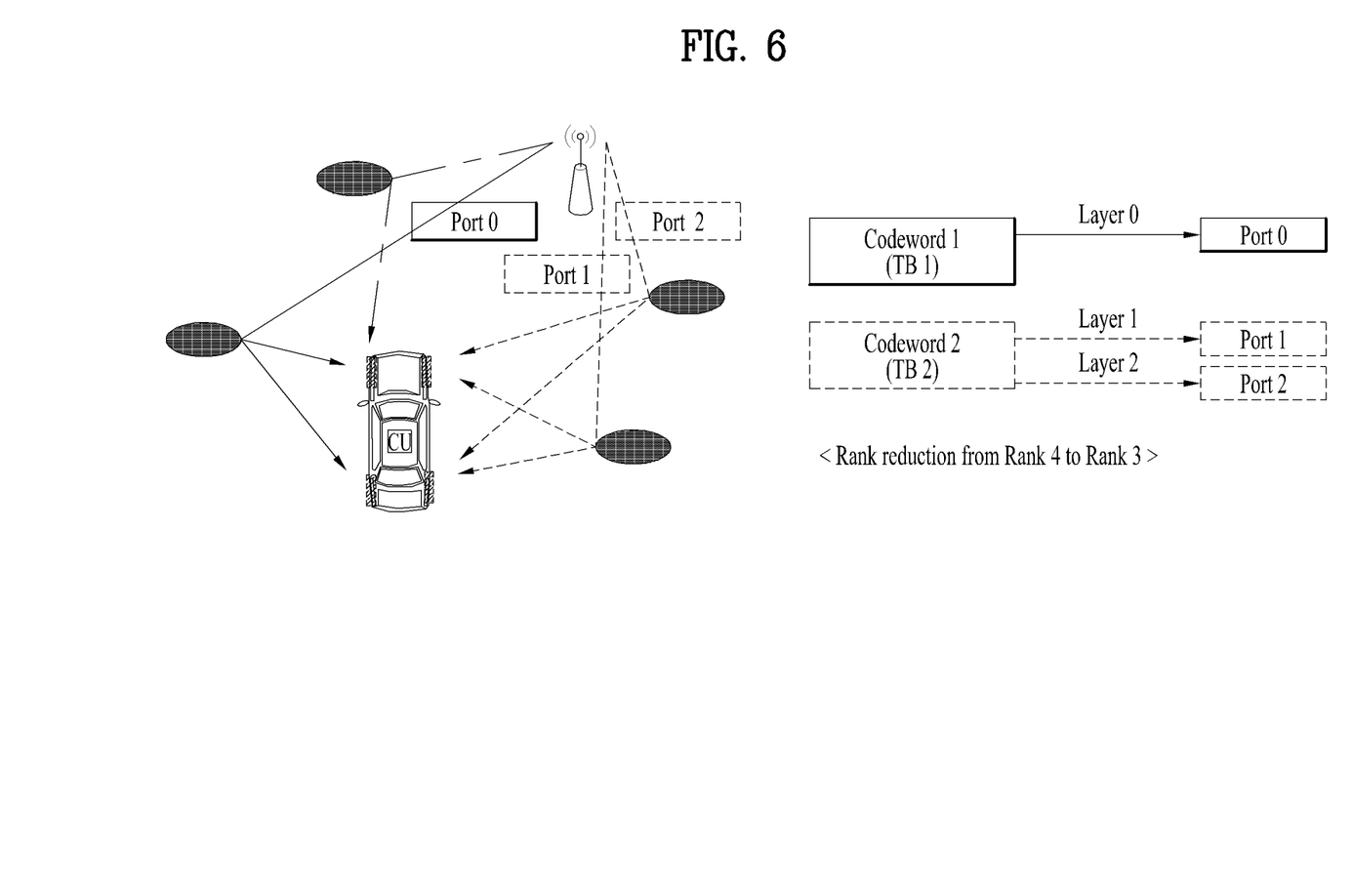
FIG. 6 is an exemplary diagram showing the path of each codewords in DAS system.

FIG. 6 is an exemplary diagram showing the path of each codewords in DAS system.

As shown in FIG. 6, the UE can receive 2 codewords (codeword 1 (TB1) and codeword 2 (TB2)) at the same time. In this example, codeword 1 is mapped to layer 0 and received by antenna port 0 at DU 0. Codeword 2 is mapped to layers 1 and 2, and received by antenna ports 1 and 2 at DU 1 and DU 2, respectively. That is, the channel rank of in-Vehicle DAS system is 4, but the UE or the network can determine to use only Rank 3.

It is the CU who can determine whether each codeword received at each DU is to be conveyed to the CU. Codeword 2 is received by both of DU 1 and DU 2. When DU 1 failed to decode the codeword 2 while DU 2 successfully decoded the codeword 2, DU 1 does not need to transfer the soft value of codeword 2. CU will successfully acquire the information of codeword 1 from DU 2.

On the other hand, when both of the DU 1 and DU 2 failed to decode the codeword 2, the CU may request the transfer of codeword 2 to DU 1 and DU 2 to combine the soft value of both and successfully decode it.

Following are examples of this kind of scheme.

First Example—Reporting Reception Information After Decoding

Figure 7:
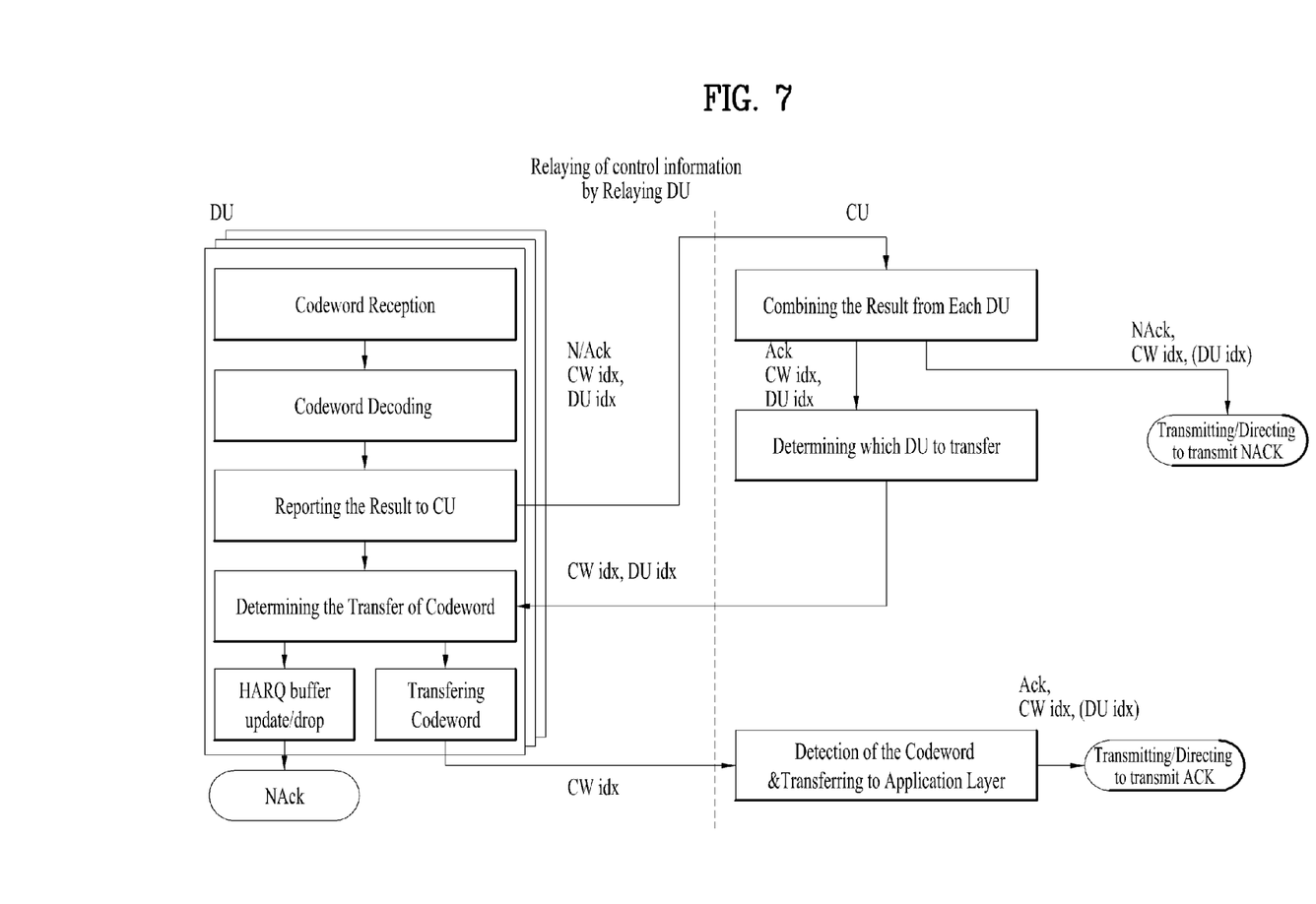
FIG. 7 shows an exemplary method for reducing signaling overhead between DUs and CU.

FIG. 7 shows an exemplary method for reducing signaling overhead between DUs and CU.

In this example, as shown in FIG. 7, each DU receives information unit. Here, the 'information unit' can be a codeword like LTE/LTE-A system, but it can be any unit for which decoding failure or success can be determined. As one example, this information unit has CRC (Cyclic Redundancy Check) to check the validity of received information. Hereinafter, this information unit is referred to as codeword for convenience of explanation.

As explained with regards to FIG. 6, the network can allocate the mapping relationship among 'codeword', 'layer' and 'DU'. Thus, it is preferable for each DU to tell the index/identifier of received codeword.

In this proposed example, each DU first decode the received codeword and/or perform CTC check. And, each DU may report the reception information about whether the received information unit is successfully decoded. This reporting may include ACK/NACK to tell the decoding result, codeword index and DU index.

CU may collect reporting from each DU. Based on the codeword index and DU index, the CU can tell which codeword is successfully decoded at a specific DU. CU may direct the DU(s) to transfer the decoded information unit, when it is successfully decoded at that DU. This direction may include codeword index, DU index, etc. On the other hand, CU may transmit negative acknowledgement (NACK) to the network when specific codeword was failed to be decoded. CU may direct the DU to transmit NACK to the network instead. The direction indicating the transfer of codeword may have a specific value indicating so.

If a specific DU receives the direction from CU indicating the transfer of the received codeword, that DU will transfer the codeword to CU. When transferring the codeword, DU may include the index of codeword together. Then, the CU can detect the codeword and forward it to application layer. And, CU may transmit Acknowledgement to the network based on this acquisition of codeword.

But, if another DU receives the direction indicating not transfer of the received codeword or not receive the direction itself, that DU may store the received codeword in HARQ buffer and/or update the HARQ buffer and/or drop the codeword.

As explained with regards to FIG. 6, one codeword can be received by two or more DUs. Also, one codeword can be splitted into two or more units and correspondingly received by corresponding number of DUs. So, even when the decoding of the codeword at specific DU is not successful, CU can acquire complete codeword information based on combining them.

Figure 8:
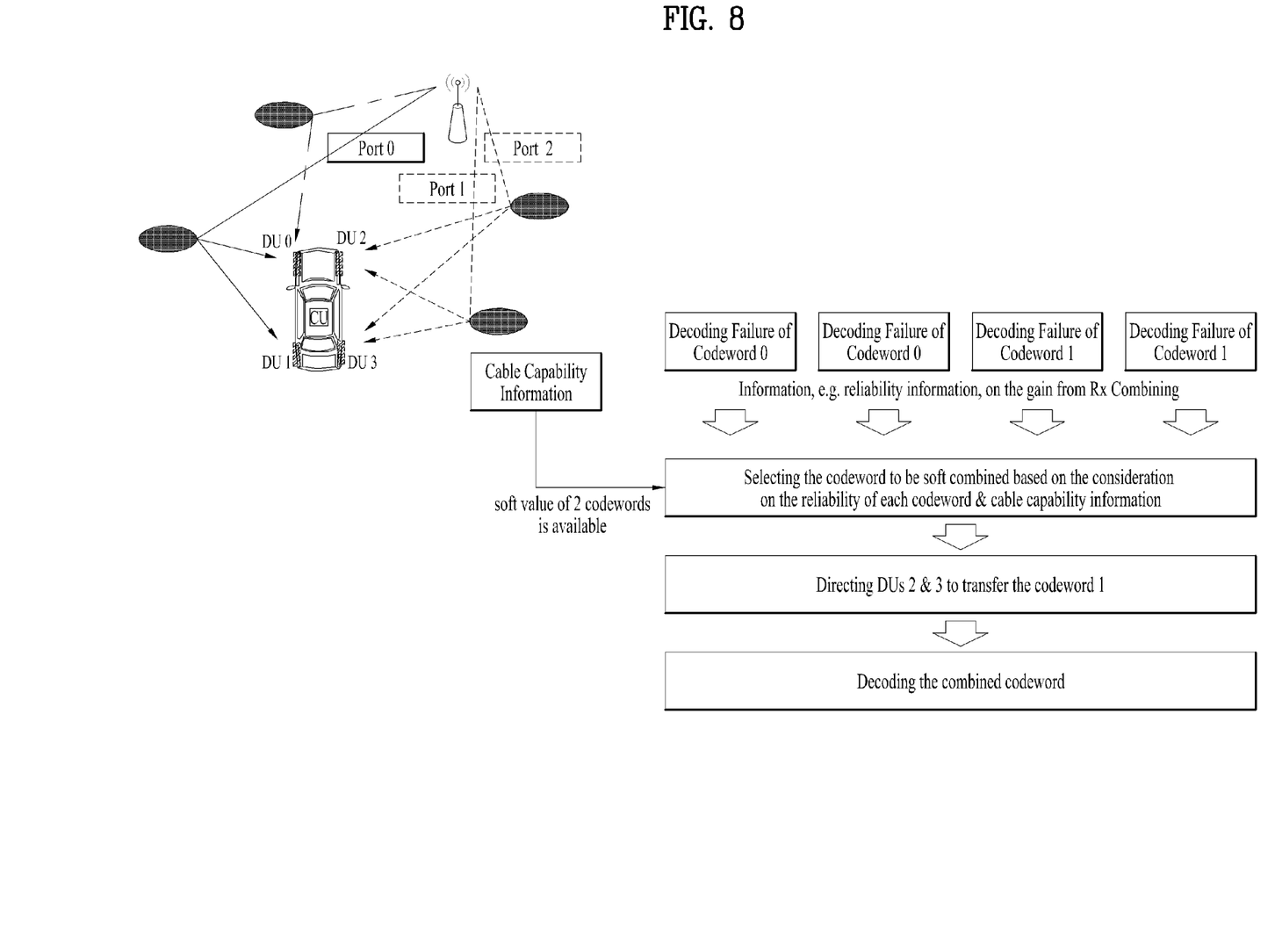
FIG. 8 is an exemplary diagram for explaining the determination of CU according to one embodiment of the present invention.

FIG. 8 is an exemplary diagram for explaining the determination of CU according to one embodiment of the present invention.

In FIG. 8, codeword 0 is received by DU 1 and DU 2 while codeword 1 is received by DU 2 and DU 3. All the DUs 1-3 failed to decode the received codeword.

In this example, DUs 1-3 may report reception information regarding the decoding result, the reliability of reception and so on to CU. CU may also consider the cable capability information. In FIG. 8, CU acquired that the cable can transfer the soft value of 2 codewords. By considering all of them, CU may direct DU 2 and DU 3 to transfer the codeword 1 to CU. After signal combining at the CU, the CU may successfully decode the codeword 1.

When CU determined that a codeword cannot be restored even when it is combined from two or more DUs, CU may transmit NACK to the network.

Figure 9:
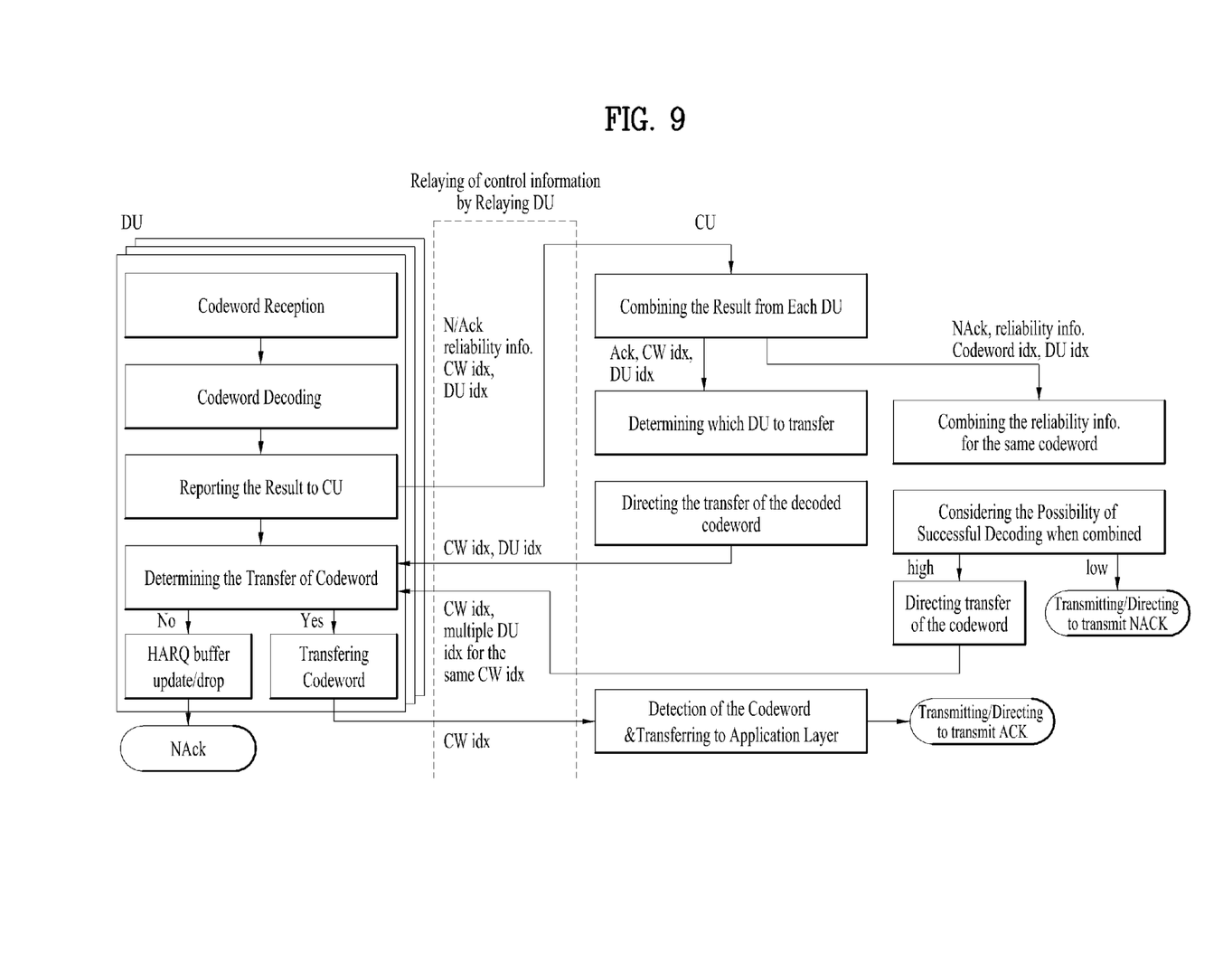
FIG. 9 shows an example of mechanism to determine the transfer of codeword according to one embodiment of the present invention.

FIG. 9 shows an example of mechanism to determine the transfer of codeword according to one embodiment of the present invention.

As explained by FIG. 7, each DU receiving the codeword may try to decode the received codeword, and report the result to CU. Based on this report, CU may direct to transfer the codeword successfully decoded.

On the other hand, CU may consider the reliability information of the codeword not successfully decoded. CU may consider the reliability information of the same codeword from two or more DUs. Based on these, CU may consider the possibility of successful decoding of that codeword. If CU determined that it would be successfully decoded when it combined from multiple DUs, CU can direct the DUs to transfer the soft value of that codeword. If not, CU may transmit NACK to the network, or direct the DU to transmit NACK to the network.

Second Example—Reporting Reception Information Before Decoding

In the second example, DU may report the reception information to CU even before performing the decoding of the received codeword. CU may determine whether to decode that codeword and/or to transfer that codeword.

In the first example, DU decodes the received codeword regardless of the determination of CU. When CU fails to restore that codeword, the decoding process of that DU would be a waist, so increase the delay of the processing. Also, when CU determined to transfer the soft value of the received codewords from two or more DUs and decode the combined codeword, the decoding time for that codeword would be two times more than usual.

Figure 10:
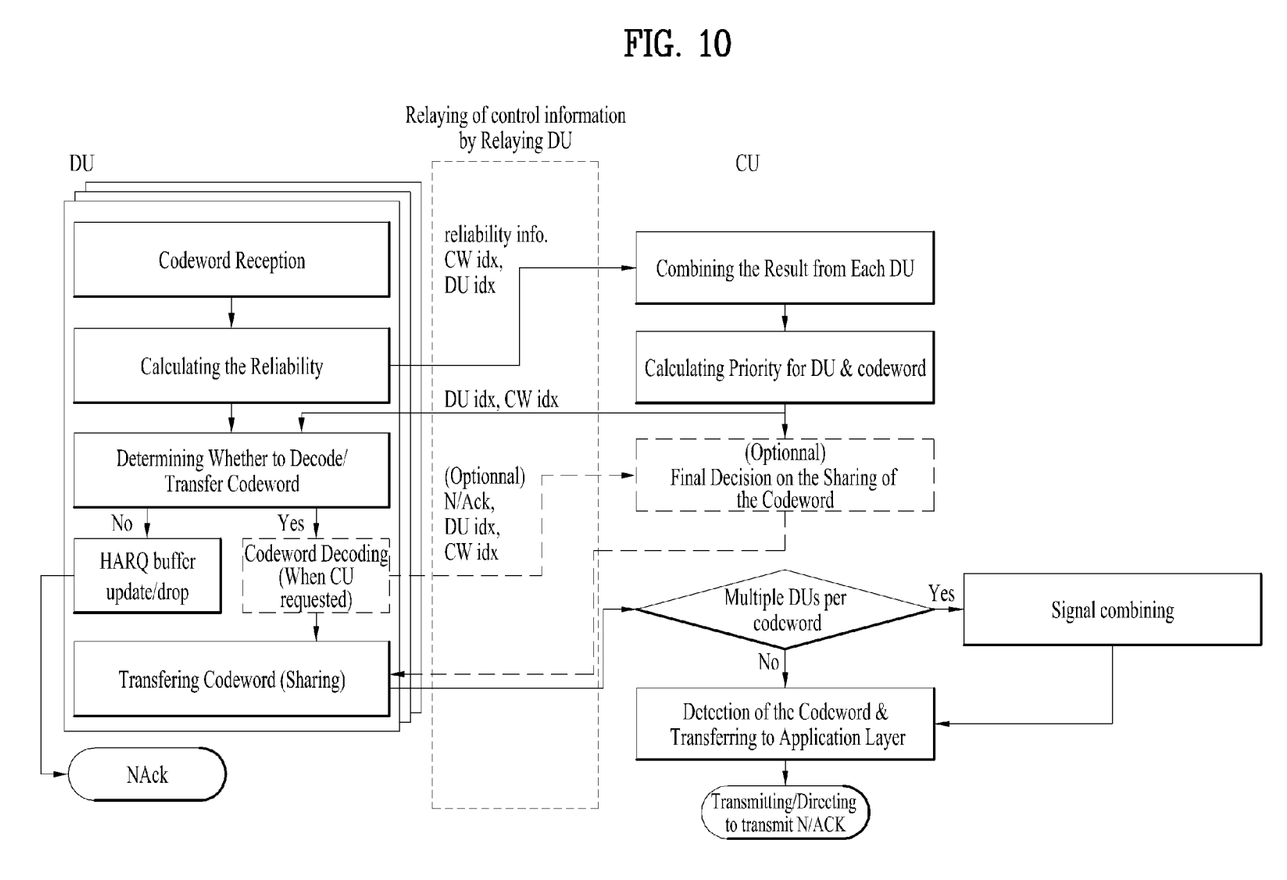
FIG. 10 is a diagram for explaining the mechanism according to one embodiment of the present invention.

FIG. 10 is a diagram for explaining the mechanism according to one embodiment of the present invention.

Each DU may receive codeword from the network. As shown in FIG. 10, the DUs according to this example may report the reception information before performing the decoding. This reception information may include reliability of the received codeword, the index of the codeword, and the index of DU. The reliability information may include the reception SNR, SINR, the reception status considering the reported CSI, etc.

CU may combine the information received from multiple DUs. CU may determine whether to decode and/or whether to transfer the corresponding codeword at each DU. CU may also consider the priority of each codeword, which will is discussed later.

When DU received the direction indicating to decode the codeword, that DU will decode the codeword. In a specific case, CU may direct the DU to decode the codeword and report again based on the decoding. CU, then, can finally determine whether to transfer that codeword to CU or not.

CU may consider the priority of each codeword. The priority of codeword can be as follows:

Priority 1: transferring the codeword to the CU without decoding that codeword.

Priority 2: transferring the codeword to the CU only when decoding of the codeword is successful.

Priority 3: decoding the codeword and reporting the decoding result to the CU.

Priority 4: not sharing the codeword with the CU or another DU.

The direction of CU may be based on one of the priority as stated above.

Device Configuration

Figure 11:
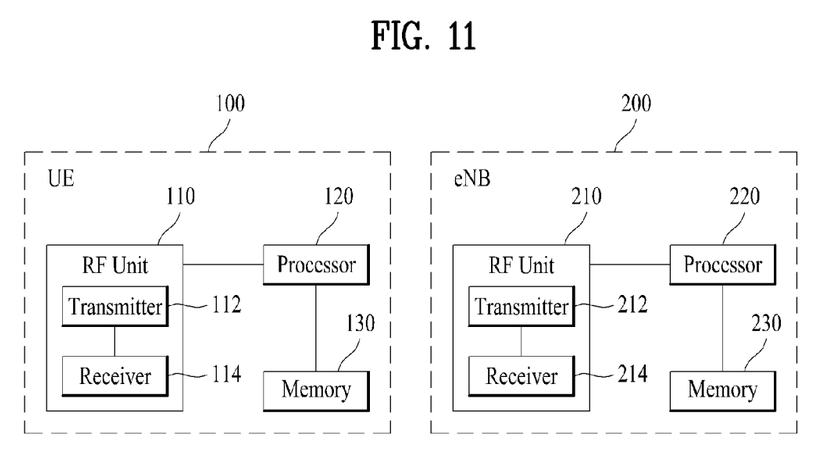
FIG. 11 is a block diagram for a user equipment and a eNB in accordance with the present invention.

FIG. 11 is a block diagram for a user equipment and a eNB in accordance with the present invention.

In FIG. 11, a user equipment 100 and a eNB 200 can include a radio frequency (RF) unit 110/210, a processor 120/220 and a memory 130/230, respectively. Although FIG. 11 shows one-to-one communication environment between the user equipment 100 and the eNB 200, communication environment can be constructed between a plurality of user equipment and the eNB 200. And, the eNB 200 depicted in FIG. 11 can be applied to both a macro cell eNB and a small cell eNB.

Each of the RF units 110/210 can include a transmission unit 111/211 and a reception unit 112/212, respectively. The transmission unit 111 and the reception unit 112 of the user equipment 100 are configured to transmit and receive a signal with the eNB 200 and different user equipments. They can be referred to as 'transceiver'. The processor 120 is functionally connected with the transmission unit 111 and the reception unit 112 and is configured to control the transmission unit 111 and the reception unit 112 to transmit and receive signal with different devices. And, the processor 120 performs various processing on a signal to be transmitted and transmits the signal to the transmission unit 111. The processor performs processing on a signal received by the reception unit 112.

If necessary, the processor 120 can store information included in an exchanged message in the memory 130. The user equipment 100 can perform the aforementioned various embodiments of the present invention with the above-mentioned structure.

The transmission unit 211 and the reception unit 212 of the eNB 200 are configured to transmit and receive a signal with different eNB and user equipments. The processor 220 is functionally connected with the transmission unit 211 and the reception unit 212 and is configured to control the transmission unit 211 and the reception unit 211 to transmit and receive signal with different devices. And, the processor 220 performs various processing on a signal to be transmitted and transmits the signal to the transmission unit 211. The processor performs processing on a signal received by the reception unit 212. If necessary, the processor 220 can store information included in an exchanged message in the memory 230. The eNB 200 can perform the aforementioned various embodiments of the present invention with the above-mentioned structure.

Each of the processors 120/220 of the user equipment 100 and the eNB 200 indicates (e.g., control, adjust, manage) operations in the user equipment 100 and the eNB 200. Each of the processors 120/220 can be connected with the memory 130/230 storing program codes and data. The memory 130/230 is connected with the processor 120/220 and stores an operating system, an application, and general files.

The processor 120/220 of the present invention can be named by such a terminology as a controller, a microcontroller, a microprocessor, a microcomputer and the like. Meanwhile, the processor can be implemented by hardware, firmware, software and a combination thereof. In the implementation by hardware, ASICs (application specific integrated circuits), DSPs (digital signal processors), DSPDs (digital signal processing devices), PLDs (programmable logic devices), FPGAs (field programmable gate arrays) and the like configured to perform the present invention can be installed in the processor 120/220.

Meanwhile, the aforementioned method can be written by a program executable in a computer and can be implemented by a general digital computer capable of operating the program using a computer readable medium. And, data structure used for the aforementioned method can be recorded in the computer readable medium in various means. Program storing devices usable for explaining a storing device including an executable computer code to perform various methods of the present invention should not be comprehended as temporary objects such as carrier waves and signals. The computer readable medium includes such a storing medium as a magnetic storing medium (e.g., a ROM, a floppy disk, a hard disk and the like) and an optical reading medium (e.g., a CD-ROM, a DVD and the like).

While the present invention has been described and illustrated herein with reference to the preferred embodiments thereof, it will be apparent to those skilled in the art that various modifications and variations can be made therein without departing from the spirit and scope of the invention. Thus, the disclosed methods should be considered in an explanatory viewpoint instead of a limitative viewpoint. The scope of the present invention is shown at not the detail description of the invention but the appended claims. Thus, it is intended that the present invention covers the modifications and variations of this invention that come within the scope of the appended claims and their equivalents.

INDUSTRIAL APPLICABILITY

While the present document mainly discuss this with the example of implementing in-vehicle DAS system, it is only exemplary, and the proposed scheme/structure can be used for simple configuration of MIMO system with distributed antennas.

What is claimed is:

1. A method for a user equipment (UE) to receive signals from a network, the method comprising:
   receiving a first information unit from the network by a first distributed unit (DU) among multiple DUs distributed within the UE;
   reporting, by the first DU, reception information of the first information unit to a central unit (CU) of the UE before decoding the received first information unit, wherein the CU controls the multiple DUs;
   receiving, at the first DU from the CU, a direction indicating whether the first DU is to decode the received first information unit or not, and indicating whether the first DU is to transfer the received first information unit to the CU or another DU within the UE,
   wherein the CU sends the direction based on the reception information of the first received information unit; and
   decoding and transferring, by the first DU, the received first information unit to the CU and the another DU within the UE when the direction indicates a specific value,
   wherein the CU sends the direction with an indication that the first DU is to transfer the first information unit.

2. The method of claim 1, wherein the first information unit is a unit for which determination of a decoding failure or success is made.

3. The method of claim 1, wherein the CU sends a second direction to transfer the first information unit, only when the first information unit is successfully decoded by the first DU.

4. The method of claim 1, wherein the first and second information units represent the same information.

5. The method of claim 1, wherein the CU sends a negative acknowledgement (NACK) for the first information unit to the network, when the CU fails to acquire a successfully decoded first information unit.

6. The method of claim 1, wherein the direction indicates one of:
   transferring the first information unit to the CU without decoding the first information unit,
   transferring the first information unit to the CU only when decoding of the first information unit is successful,
   decoding the first information unit and reporting a decoding result to the CU, or
   not sharing the first information unit with the CU or the another DU.

7. The method of claim 1, wherein the reception information includes an index of the first information unit and an index of the first DU.

8. The method of claim 7, wherein the CU identifies whether the first information unit received by the first DU represents the same information or independent information from a second information unit received by a second DU based on the index of the first information unit.

9. The method of claim 1, wherein the UE is implemented on a motor vehicle, and
   wherein the multiple DUs are distributed within the motor vehicle.

10. A user equipment (UE) comprising:
    multiple distributed units (DUs), each of which includes an antenna component to receive an information unit from a network; and
    a central unit (CU) configured to control the multiple DUs, wherein each of the multiple DUs further includes:
    a processor configured to report reception information of the information unit received at the DU to the CU before decoding the information unit received at the DU; and
    an internal communication unit configured to transfer the information unit received at the DU in response to a reception of a direction from the CU indicating
    whether the DU is to decode the information unit received at the DU or not, and indicating whether the DU is to transfer the received information unit to the CU or another DU within the UE,
    wherein the CU includes an internal communication unit configured to receive the reception information from each of the multiple DUs and to send the direction based on the reception information from each of the multiple DUs,
    wherein each of the multiple DUs is further configured to decode and transfer the received information unit to the CU and the another DU within the UE when the direction indicates a specific value, and
    wherein the CU sends the direction with an indication that the DU is to transfer the information unit.

11. The UE of claim 10, wherein the CU further includes:
    a processor configured to process the reception information from each of the multiple DUs and generate the direction; and
    a wireless transmitter configured to transmit a negative acknowledgement (NACK) to the network, when the CU fails to acquire a successfully decoded information unit.

12. The UE of claim 10, wherein the UE is implemented on a motor vehicle, and
    wherein the multiple DUs are distributed within the motor vehicle.

13. The method of claim 1, wherein the CU determines the direction based on a priority of the first information unit, and wherein the priority is determined based on the reception information from the first DU.

14. The UE of claim 10, wherein the CU determines the direction based on a priority of the information unit, and wherein the priority is determined based on the reception information from the each of the multiple DUs.

* * * * *